No. 761,440. Patented May 31, 1904.

UNITED STATES PATENT OFFICE.

AUGUSTUS BISCHLER, OF BASLE, SWITZERLAND, ASSIGNOR TO BASLE CHEMICAL WORKS, OF BASLE, SWITZERLAND.

PROCESS OF MAKING INDOXYL, &c.

SPECIFICATION forming part of Letters Patent No. 761,440, dated May 31, 1904.

Application filed March 9, 1904. Serial No. 197,342. (No specimens.)

*To all whom it may concern:*

Be it known that I, AUGUSTUS BISCHLER, doctor of philosophy and chemist, a subject of the Emperor of Russia, and a resident of Basle, Switzerland, have invented new and useful Improvements in the Manufacture of Indoxyl, its Homologues, and their Derivatives, of which the following is a clear and complete specification.

By melting the phenylglycin salts with caustic alkalies only about eight to ten per cent. of indoxyl is formed. A little more indoxyl is obtained by heating a mixture of phenylglycin salt, caustic alkali, and sodium alcoholate; but the yield of indigo is much too small to think of making any technical use of this proceeding.

I have found that a much better yield of indoxyl is obtained by not employing simply sodium alcoholate for the condensation of the phenylglycin salt to indoxyl, but a product obtained by dissolving sodium in an equivalent quantity of an alcoholic solution of caustic potassium hydroxid (caustic potash) and distilling off the alcohol *in vacuo*. The condensing effect of such a product is further increased by an addition of metallic sodium and eventually of small quantities of some slightly-reducing substances, such as sodium sulfite. The small quantities of sulfite probably have a conserving influence on the alcoholate, thus increasing its efficiency.

Example I: 6.9 parts of sodium are dissolved in a solution of seventeen parts of well-dried caustic potash in one hundred and fifty parts alcohol of one hundred per cent. This solution is mixed with 0.5 parts sodium sulfite and the excess of alcohol completely distilled off in an oil-bath by employing vacuum toward the end of the operation. To the yet hot mixture thus obtained are added forty parts caustic potash and twenty parts sodium salt of phenylglycin, and the mixture is heated to 220° centigrade while stirring. Then one part sodium and 0.5 parts sodium sulfite are still added, and the whole is melted down for about one hour at a temperature of 240° to 250° centigrade. The thus-obtained indoxyl is transformed into indigo in the usual manner.

In the above example the phenylglycin salt may be replaced by the alkali salts of other arylglycins or of the derivatives of arylglycins, whereby the corresponding indoxyl derivatives are formed. The reaction product of sodium on alcoholic caustic potash has also a very good condensing effect on the arylglycin compounds and their derivatives—such as phenylglycin-anilid, phenylglycin-phenylglycid, alpha-phenylhydantoins, &c., thus forming indoxyl or homologues of indoxyl.

Example II: The yet hot reaction product of sodium on alcoholic caustic potash produced according to example I, but without addition of sodium sulfite, is mixed with fifty parts caustic potash and twenty-five parts phenylglycin-anilid, heated to 220° centigrade, and then three parts of sodium are added. This mixture is melted down for about one hour at 250° to 260° centigrade, (until tests successively taken from this mass show no more increase of indigo.) The anilin vapors are conducted to a cooling apparatus, (condenser.) The reaction product is worked up to indigo in the habitual manner.

What I claim is—

1. The described process for the manufacture of indoxyl, its homologues and their derivatives by melting alkali salts and other compounds of the arylglycins and of their derivatives with caustic alkalies, metallic sodium and a reaction product of sodium on alcoholic caustic potash, obtained by dissolving sodium in an alcoholic solution of caustic potash and distilling off the alcohol.

2. The described process for the manufacture of indoxyl, its homologues and their derivatives by melting alkali salts and other compounds of the arylglycins and of their derivatives with caustic alkalies, metallic sodium, a small quantity of a slightly-reducing substance and a reaction product of sodium on alcoholic caustic potash, obtained by dissolving sodium in an alcoholic solution of caustic potash and distilling off the alcohol.

3. The described process for the manufacture of indoxyl, its homologues and their derivatives by melting alkali salts and other compounds of the arylglycins and of their derivatives with caustic alkalies, metallic sodium, neutral sulfite and a reaction product of sodium on alcoholic caustic potash, obtained by dissolving sodium in an alcoholic solution of caustic potash and distilling off the alcohol.

In witness whereof I have hereunto signed my name, this 26th day of February, 1904, in the presence of two subscribing witnesses.

AUGUSTUS BISCHLER.

Witnesses:
   GEO. GIFFORD,
   AMAND RITTER.